H. D. HAMPER & T. R. McKNIGHT.
DUMP CAR.
APPLICATION FILED JUNE 4, 1909.
961,772.
Patented June 21, 1910.
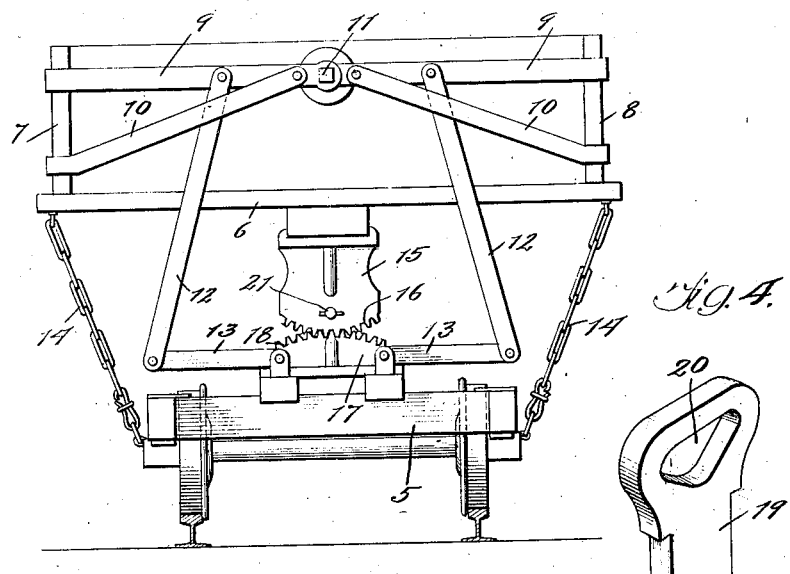
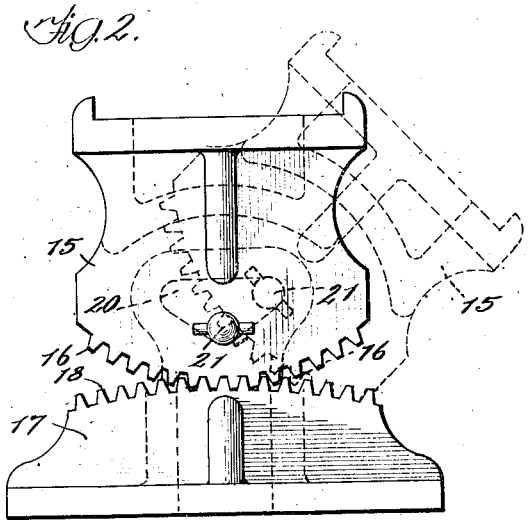
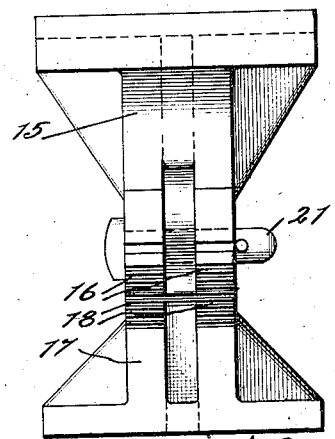

UNITED STATES PATENT OFFICE.

HARRY D. HAMPER AND THOMAS R. McKNIGHT, OF AURORA, ILLINOIS, ASSIGNORS TO WESTERN WHEELED SCRAPER COMPANY, OF AURORA, ILLINOIS, A CORPORATION OF ILLINOIS.

DUMP-CAR.

961,772.

Specification of Letters Patent. Patented June 21, 1910.

Application filed June 4, 1909. Serial No. 500,104.

*To all whom it may concern:*

Be it known that we, HARRY D. HAMPER and THOMAS R. MCKNIGHT, citizens of the United States, residing at Aurora, in the county of Kane and State of Illinois, have invented certain new and useful Improvements in Dump-Cars, of which the following is a specification, reference being had to the accompanying drawings.
Our invention relates to dump-cars, and has for its object to provide certain improvements in dump-cars of the type shown and described in Letters Patent of the United States, No. 612,263, granted to Thomas R. McKnight October 11, 1898. In cars of this type the car-body, which is provided with side-gates, is arranged to be tilted at one side or the other of the truck which supports it so as to discharge its load, the side-gates being automatically held up out of operative position when the car-body is tilted in dumping the load. In the construction of said patent the car-body is supported upon a number of pivoted bearings, the car swinging about the pivots of such bearings as it is tilted to one side or the other, such pivoted bearings being constructed so that they are separable from the truck, thus enabling the car-body to be readily removed from the truck when desired, or permitting the separation of the car-body and truck in case of derailment or other accident.

The object of our present invention is to provide a dump-car having the advantages of said prior construction, in which provision is made for carrying the car-body bodily over toward one side or the other of the truck so that it may be turned to a more nearly vertical position and its lower edge brought nearer the side of the truck in the operation of dumping. We accomplish this object as illustrated in the drawings and as hereinafter described.
What we regard as new is set forth in the claims.

In the drawings,—Figure 1 is an end view of our improved car; Fig. 2 is an enlarged detail, being a side view of one of the rocker bearings, the dumping position being shown in dotted lines; Fig. 3 is an edge view thereof; and Fig. 4 is a view of one of the pivot-pins or bars.

Referring to the drawings,—5 indicates the truck, which may be of any suitable construction.

6 indicates the car-body, which is provided with side-gates 7—8. As best shown in Fig. 1, said side-gates are carried by pivoted arms or straps 9—10 pivoted at 11 to the ends of the car-body at the longitudinal center thereof. The straps 9 are connected by links 12 with horizontal arms 13 pivotally connected with the truck at opposite sides of the center thereof, as best shown in Fig. 1,—the arrangement being such that when the car-body is dumped at either side the arms 13 at that side engage the truck and through the links 12 hold up the side-gate to which they are connected so that a clear passage is presented for the discharge of the load.

14 indicates chains for holding the car-body in a horizontal position when transporting the load.

The car-body 6 is supported by rocking brackets 15 placed at suitable intervals along its longitudinal center under the car-body and secured thereto. The lower surfaces of said brackets are curved, as shown at 16 in the drawings, thereby forming extended rocker bearings on which the weight of the car and load is carried. The brackets 15 rest on pedestals or supports 17, which are secured upon the truck and are provided with curved upper surfaces, as shown at 18 in the drawings, forming bearing surfaces on which the rocker-brackets 15 rest and travel. The brackets 15 are connected to and held in position on the supports 17 by pivot-pins 19 which are adapted to fit in suitable vertical sockets provided in the supports 17, as indicated by dotted lines in Fig. 2. In the construction shown said pivot-pins are provided at their upper ends with triangular openings 20 to receive pivots 21 which connect the brackets 15 with said pivot-pins. As best shown in Figs. 2 and 4, the openings 20 are wider at the top than at the bottom, and the arrangement is such that when the car-body is in its normal position the pivots 21 lie in the lower portions of such openings. When, however, the car-body is rocked to dump the load at one side or the other, the pins 21 move in the openings 20 to the upper portion thereof, as indicated by dotted lines in Fig. 2, thereby permitting the brackets 15 to travel transversely of the truck, shifting the fulcrum point to one side or the other, and thus permitting the car-body to assume a more nearly vertical position. Instead of making the openings 20 triangular, they may be of any other suitable shape to permit the requisite movement of the car-body.

We thus secure all the advantages of the separable pivotal connection of the car-body and truck in a car which is supported on the truck by traveling bearings.

In order to bring the rocker back to central position at all times, its lower face is corrugated or provided with rack-teeth, and the upper surface of the pedestal is similarly corrugated, as shown in the drawings.

That which we claim as our invention, and desire to secure by Letters Patent, is,—

1. In a dump-car, the combination of a truck, a car-body, a rocker-bearing for said car-body comprising an upper member and a lower member, said upper member being adapted to rock on said lower member to tilt the car-body, and stationary means loosely connected with the truck and movably connected with the car-body for connecting the car-body and truck.

2. In a dump-car, the combination of a truck, a car-body, a rocker-bearing for said car-body comprising an upper member and a lower member, said upper member being adapted to rock on said lower member to tilt the car-body, and means fitted in a socket in one of said members and movably connected with the other member for holding said members in position.

3. In a dump-car, the combination of a truck, a car-body, a rocker-bearing for said car-body comprising an upper member and a lower member, said upper member being adapted to rock on said lower member to tilt the car-body, and a pin pivotally connected with the car-body and fitted in a vertical socket in the truck.

4. In a dump-car, the combination of a truck, a car-body, a rocker-bearing for said car-body comprising a lower member and an upper member adapted to rock upon said lower member, a pin having an opening in its upper end and detachably connected with said lower member, and a pivot connecting said pin with the upper member.

5. In a dump-car, the combination of a truck, a car-body, a rocker-bearing for said car-body comprising a lower member and an upper member adapted to rock upon said lower member, a pin fitted in a socket in said lower member and having a triangular opening in its upper end portion, and a pivot connecting said pin with said upper member.

6. In a dump-car, the combination of a car-body, a rocker-bearing for said car-body comprising an upper member and a lower member, said upper member being adapted to rock on said lower member to tilt the car-body, and means loosely connected with one of said members and having a recess, the other member having a pin moving in said recess and acting to limit the extent to which the upper member may rock.

7. In a dump-car, the combination of a car-body, a rocker-bearing for said car-body comprising an upper member and a lower member, said upper member being adapted to rock on said lower member to tilt the car-body, and means fitted in a socket in one of said members and having a recess, the other member having a pin moving in said recess and acting to limit the extent to which the upper member may rock.

8. In a dump-car, the combination of a car-body, a rocker-bearing for said car-body comprising an upper member and a lower member, said upper member being adapted to rock on said lower member to tilt the car-body, and means loosely connected with the lower member and having a movable engagement with the upper member for preventing displacement of the car-body.

HARRY D. HAMPER.
THOMAS R. McKNIGHT.

Witnesses:
FRANCES B. FLYNN,
M. T. BABB.